United States Patent
Schefer et al.

(10) Patent No.: US 7,162,864 B1
(45) Date of Patent: Jan. 16, 2007

(54) METHOD FOR CONTROL OF NOX EMISSION FROM COMBUSTORS USING FUEL DILUTION

(75) Inventors: Robert W. Schefer, Alamo, CA (US); Jay O Keller, Oakland, CA (US)

(73) Assignee: Sandia National Laboratories, Livermore, CA (US)

( * ) Notice: Subject to any disclaimer, the term of this patent is extended or adjusted under 35 U.S.C. 154(b) by 25 days.

(21) Appl. No.: 10/701,763

(22) Filed: Nov. 4, 2003

(51) Int. Cl.
*F01N 3/00* (2006.01)

(52) U.S. Cl. ............................ 60/286; 60/274; 60/278; 60/280; 60/285; 123/1 A; 123/DIG. 12; 431/4; 431/5; 431/350

(58) Field of Classification Search ............... 60/274, 60/278, 279, 280, 285, 286, 320; 123/1 A, 123/3, DIG. 12; 431/4, 5, 12, 75, 350
See application file for complete search history.

(56) References Cited

U.S. PATENT DOCUMENTS

| | | | | |
|---|---|---|---|---|
| 3,862,624 A | * | 1/1975 | Underwood | .................. 60/309 |
| 4,041,910 A | * | 8/1977 | Houseman | .................. 123/58.8 |
| 4,442,801 A | * | 4/1984 | Glynn et al. | .................... 123/3 |
| 4,993,386 A | * | 2/1991 | Ozasa et al. | ............... 123/25 J |
| 5,972,301 A | * | 10/1999 | Linak et al. | .................. 423/53 |
| 6,079,373 A | * | 6/2000 | Kawamura | ...................... 123/3 |
| 6,122,909 A | * | 9/2000 | Murphy et al. | ............... 60/286 |
| 6,397,787 B1 | * | 6/2002 | Yamada et al. | .......... 122/367.1 |
| 6,655,324 B1 | * | 12/2003 | Cohn et al. | ................. 123/1 A |
| 6,736,635 B1 | * | 5/2004 | Takemura et al. | .......... 431/353 |
| 6,823,852 B1 | * | 11/2004 | Collier, Jr. | .................. 123/527 |

* cited by examiner

*Primary Examiner*—Binh Q. Tran
(74) *Attorney, Agent, or Firm*—Donald A. Nissen

(57) ABSTRACT

A method of controlling NOx emission from combustors. The method involves the controlled addition of a diluent such as nitrogen or water vapor, to a base fuel to reduce the flame temperature, thereby reducing NOx production. At the same time, a gas capable of enhancing flame stability and improving low temperature combustion characteristics, such as hydrogen, is added to the fuel mixture. The base fuel can be natural gas for use in industrial and power generation gas turbines and other burners. However, the method described herein is equally applicable to other common fuels such as coal gas, biomass-derived fuels and other common hydrocarbon fuels. The unique combustion characteristics associated with the use of hydrogen, particularly faster flame speed, higher reaction rates, and increased resistance to fluid-mechanical strain, alter the burner combustion characteristics sufficiently to allow operation at the desired lower temperature conditions resulting from diluent addition, without the onset of unstable combustion that can arise at lower combustor operating temperatures.

8 Claims, 5 Drawing Sheets

METHOD FOR CONTROL OF NOX EMISSION FROM COMBUSTORS USING FUEL DILUTION

STATEMENT OF GOVERNMENT INTEREST

This invention was made with Government support under contract no. DE-AC04-94AL85000 awarded by the U.S. Department of Energy to Sandia Corporation. The Government has certain rights in the invention.

CROSS-REFERENCE TO RELATED APPLICATIONS

Not applicable.

FIELD OF THE INVENTION

This invention is directed to a method for the reduction of NOx emissions from combustors.

BACKGROUND OF THE INVENTION

The development of low emission, high performance combustors is an area of much current interest. In particular, NOx emissions from numerous major combustion sources such as gas turbines for power generation and aircraft propulsion as well as a variety of boilers, furnaces and heaters are a major environmental problem. Proposed future reduction of allowable NOx emission levels will only increase the need for effective control strategies. Consequently, the reduction of these emissions in an efficient and cost effective manner will have a major economic impact.

It is well known in the art that NOx emissions from combustors are largely determined by combustion temperature, i.e., lower combustion temperatures result in a exponential decrease in NOx emission levels. Coupled with this is the fact that the extent of reduction of gas temperatures in the combustor can be limited by the onset of combustion instabilities. These instabilities generally lead to incomplete combustion of the fuel, unstable flames, the release of higher quantities of carbon monoxide (CO) and unburned hydrocarbons (UHC), and in the limit, flame extinction. High amplitude pressure oscillations in the combustion chamber, driven by combustion heat release, can also be present. Under the right conditions, the amplitude of these pressure fluctuations increases and can, at a minimum, result in a degradation of combustor performance. In the limit, the amplitude of the pressure fluctuations can be sufficient to cause significant damage to combustor hardware and burner components. Whether the combustor operates in a stable mode or an unstable mode is determined by numerous factors. These can include, but are not limited to, fuel type, fuel/air ratio, inlet pressure, combustor geometry, combustor throughput, and the coupling between combustion chamber design and flame heat release.

Combustion consists of a chemical reaction between a mixture of fuel and air to release heat. The term equivalence ratio is often used to identify the actual quantities of fuel and air provided. As used herein, the term is defined as the ratio of fuel to air provided divided by the stoichiometric ratio of fuel to air. The stoichiometric ratio is achieved when the proper amount of air is provided to completely consume all the fuel. Thus, an equivalence ratio of unity corresponds to an amount of air exactly equal to that needed to consume all the fuel while an equivalence ratio less than unity indicates excess air, i.e., a fuel lean condition. Typically maximum combustion temperatures occur at near stoichiometric conditions (near an equivalence ratio of unity). As the equivalence ratio exceeds or becomes less than unity the combustion temperature decreases with a concomitant decrease in NOx emissions since these emissions are a strong function of temperature, increasing exponentially with increasing temperature.

Most current combustors operate in a non-premixed mode where the fuel and air are introduced separately. An advantage of this mode is that potential safety problems such as flame flashback, which can occur when the fuel and air are premixed prior to combustion, are eliminated. In the non-premixed mode combustion occurs predominately at stoichiometric conditions where the maximum temperatures are produced. As discussed above, this high temperature combustion maximizes the production of NOx. The addition of diluents, such as nitrogen or water vapor, can be an effective control strategy for NOx emissions since they tend to lower the combustion temperature. However, this emissions control strategy is limited by the finite operating range of a combustor. At high dilution levels the flame temperature becomes sufficiently low that the heat loss rate exceeds the combustion heat release and the flame can no longer sustain itself. This condition is referred to as the "flame blowout limit" leads to flame extinction and provides an upper boundary for the amount of diluent addition. It is known in the art that because of the wide flammability limits and faster burning rates of hydrogen, the addition of hydrogen to a conventional hydrocarbon fuel, such as methane or natural gas, significantly improves the low temperature combustion characteristics and extends the lean fuel blowout limit so that lower temperature operation can be achieved. A more detailed discussion of the effects of hydrogen on combustion characteristics can be found in co-pending application Ser. No. 10/091,044, filed Mar. 4, 2002, entitled "Method for Controlling Lean Combustion Stability".

Several approaches are currently used in gas turbine combustion systems to reduce NOx emissions. These are typically passive control approaches that include changes in combustion chamber design, variable geometry designs, lean-premixed combustion, staged combustion designs selective catalytic reduction (SCR) with ammonia addition and modification of the injected fuel distribution pattern by modification of the fuel injector design or the air inlet pattern, among others. These approaches are often costly and limited in terms of their effectiveness.

SUMMARY OF THE INVENTION

Accordingly, the invention is directed generally to a low cost and easily installed method for simultaneously reducing combustor flame temperature, thereby reducing NOx emissions, while simultaneously enhancing low temperature flame stability in order to reduce or eliminate undesirable effects associated with unstable combustion, as described above. In particular, the invention is directed to the controlled addition of a diluent such as nitrogen or water vapor, to a base fuel to reduce the flame temperature, while a the same time adding to the fuel mixture a gas capable of enhancing flame stability and improving low temperature combustion characteristics, such as hydrogen. The method described herein is equally applicable to base fuels such as natural gas, coal gas, biomass-derived fuels, methane, and other common hydrocarbon fuels. The unique combustion characteristics associated with the use of hydrogen, particularly faster flame speed, higher reaction rates, and increased resistance to fluid-mechanical strain, alter the burner combustion characteristics sufficiently to allow operation at the desired lower temperature conditions resulting from diluent addition, without the onset of unstable combustion that can arise at lower combustor operating temperatures.

The exact nature of unstable combustion is dependent on combustor geometry and operating conditions. The onset of unstable combustion resulting from reduced flame temperature is illustrated graphically for a generalized combustor geometry in FIGS. 1a and 1b where the combustor flow rate is plotted versus the flame temperature. In the combustor geometry illustrated in FIGS. 1a and 1b, the unstable operating region is located just to the right of the flame blowout limit. For a fixed combustor flow rate, unstable combustion occurs over a finite range of flame temperatures; combustion cannot be sustained at temperatures to the left of the flame blowout limit line. FIG. 1a illustrates the case for no hydrogen addition. Operation of a particular combustor for NOx control within the unstable operating region could lead to degradation in combustor performance and eventually to flame blowout or extinction.

The effect of hydrogen addition on the unstable operating region is shown in FIG. 1b. Here, the faster chemical reaction times resulting from hydrogen addition result in a shift in the unstable region and the flame blowout line to lower temperatures. This shift allows operation at the desired combustor flow rate and flame temperature.

DETAILED DESCRIPTION OF THE INVENTION

The invention is directed to a method of controlling NOx emission from combustors. The method comprises, generally, providing a inlet fuel mixture to a combustor, wherein the inlet fuel mixture comprises a base hydrocarbon fuel that can be a natural gas, methane, coal gas, biomass-derived fuel or other hydrocarbon fuel materials, a diluent gas, such as water vapor, nitrogen, or combustion product gas, and a gas capable of promoting flame stability and improve low temperature combustion characteristics, such as hydrogen.

The notation "NOx" as used herein represents all nitrogen oxides. The value of "x" can be at least one and can have non-integer values.

In order to demonstrate the efficacy of the invention, calculations were undertaken to demonstrate reduction in NOx emissions with diluent gas and flame stability gas additions to the inlet gas ($CH_4$). In the cases illustrated here, the diluent gas was $N_2$ and the gas used to provide flame stability was $H_2$.

Figure 1A:
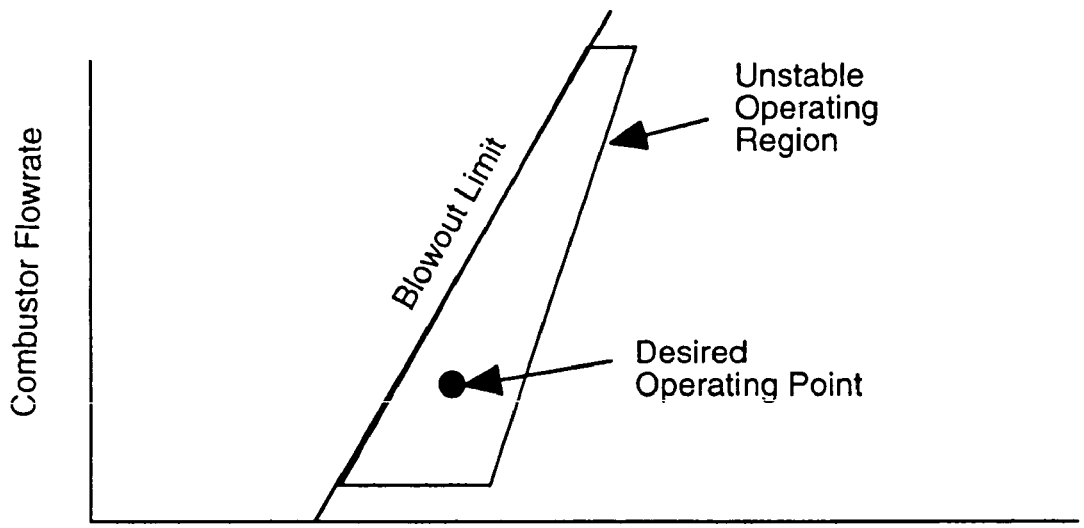
FIGS. 1a and 1b illustrate the relationship between combustor operating point and unstable operation without hydrogen addition (1a) and with hydrogen addition (1b).
Figure 1B:
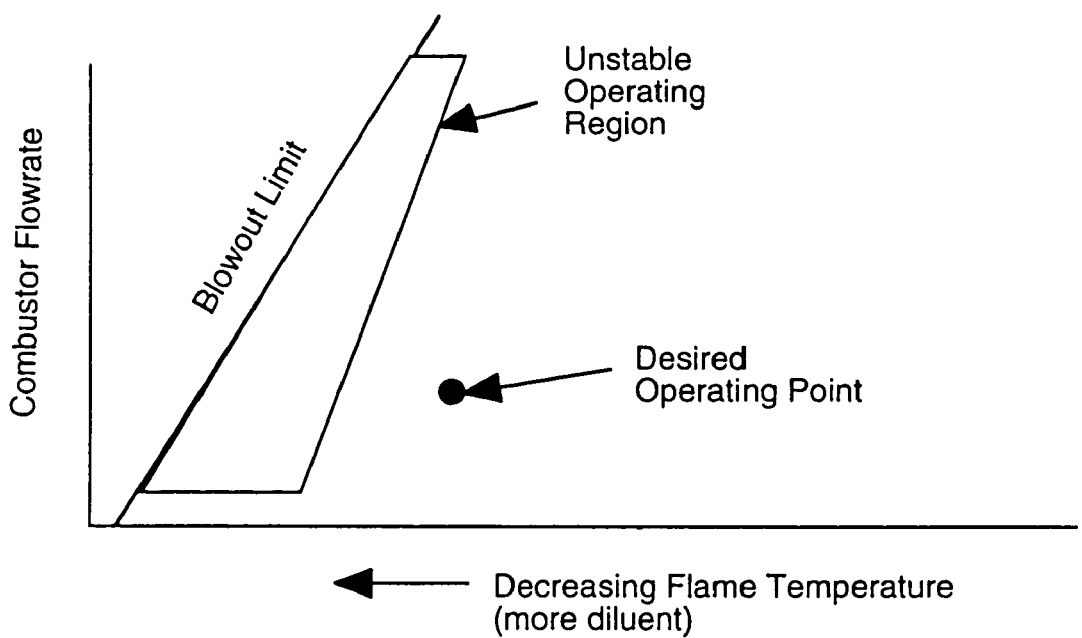
Figure 2A:
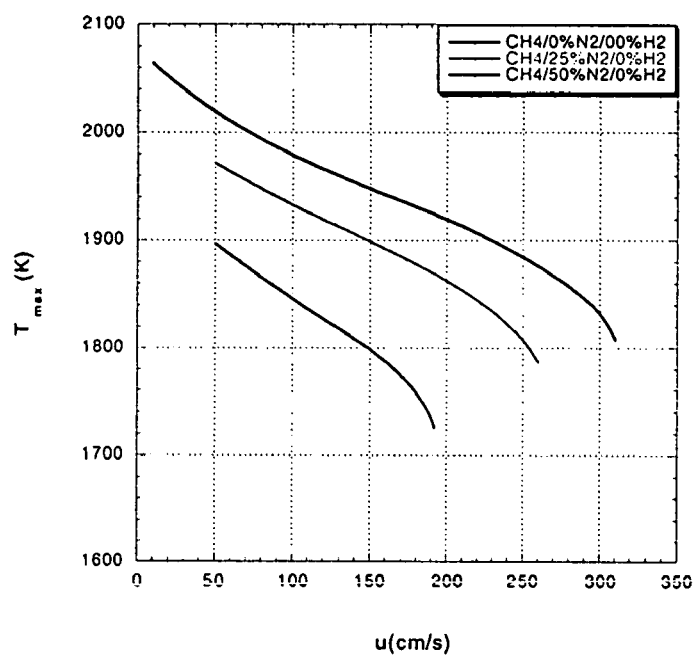
FIGS. 2a and 2b show the effect of inlet gas velocity on maximum flame temperature $T_{max}$ with no $H_2$ addition (FIG. 2a) and 50% $H_2$ (FIG. 2b).
Figure 2B:
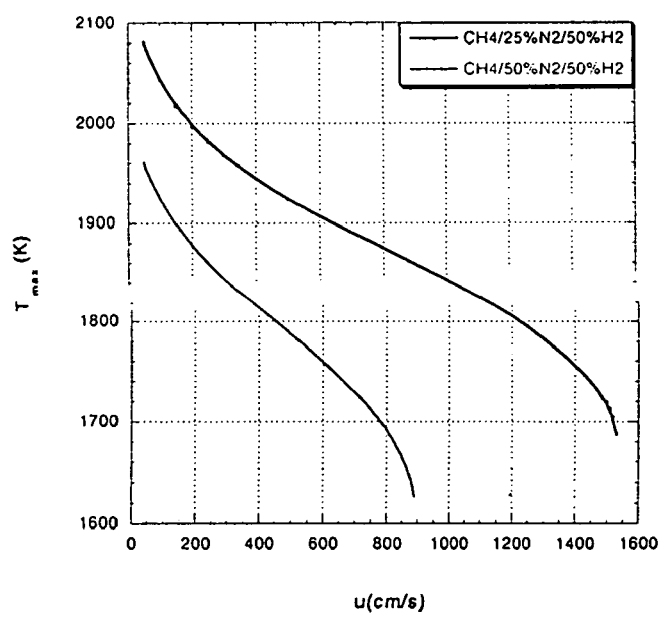
Figure 3A:
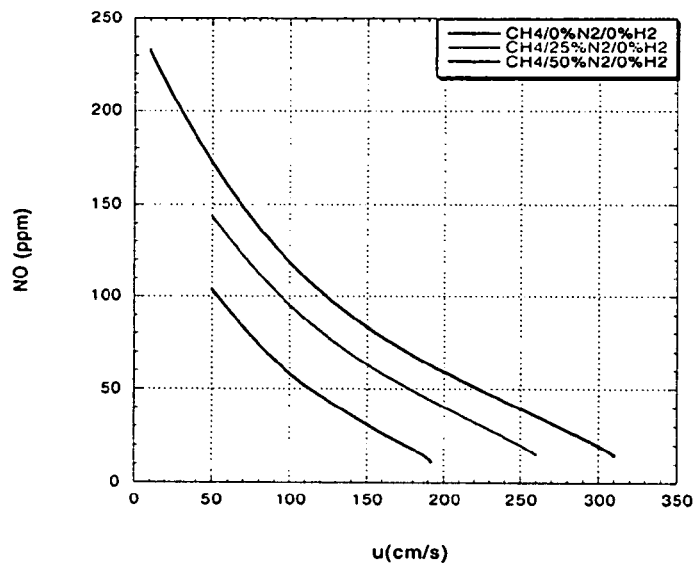
FIGS. 3a and 3b show the effect of inlet gas velocity on NO emission with no $H_2$ addition (FIG. 3a) and 50% $H_2$ (FIG. 3b).

Calculations were carried out using the opposed flow diffusion flame configuration. This flame configuration, where opposite flowing fuel and air streams are introduced, is believed to mimic many of the processes occurring in turbulent reacting flow environments (such as expected in gas turbines) where the fuel and air are introduced via separate streams and subsequently undergo mixing due to turbulent motion prior to combustion. The primary variables are the fuel stream composition (methane and hydrogen), the amount of diluent (nitrogen) added to the fuel mixture, the initial reactant temperature (assumed constant at 293 K) and the inlet velocity, u, of the separate fuel and air streams. The inlet velocity determines the strain rate, which is defined as the velocity gradient normal to the flame at the flame surface. The strain rate is defined as, $$\epsilon = du/dx$$

where u and x are the velocity component and distance normal to the flame surface. FIGS. 2a and 2b show the variation in maximum flame temperature, $T_{max}$, with increasing inlet velocity. Results are shown for pure $CH_4$ (no hydrogen addition) with nitrogen dilutions (by volume) of 0%, 25% and 50% (FIG. 2a). In general, $T_{max}$ decreases with increasing inlet velocity. This decrease is due to the fact that as the inlet gas velocity increases the flame becomes thinner, the gradients steeper and the resulting heat loss increases. At a sufficiently high velocity, the heat loss rate exceeds the heat generated due to combustion and the flame extinguishes. For example, the top curve in FIG. 2a, no dilution, shows that flame extinction occurs at u=315 cm/sec. Flame extinction thus limits the minimum temperature at which combustion can occur and still maintain a stable flame. It can also be seen that for a fixed inlet velocity, or strain rate, the effect of $N_2$ dilution is to significantly reduce the flame temperature. For example, at u=100 cm/sec the maximum flame temperature decreases from about 1980K for no dilution to 1850K with 50% $N_2$ dilution. FIG. 3a shows the resulting behavior in the NO emissions produced. As seen with $T_{max}$, the NO emissions also decrease with increasing u. This is expected since NO formation rate is a strong function (exponential) of flame temperature. A further reduction in NO can also be attributed to the shorter flame residence times at higher inlet flow rates. Thus it can be seen that addition of diluent is effective at reducing flame temperature and NO emission levels in diffusion flames and that emission levels in the low ppm range can be achieved.

Figure 3B:
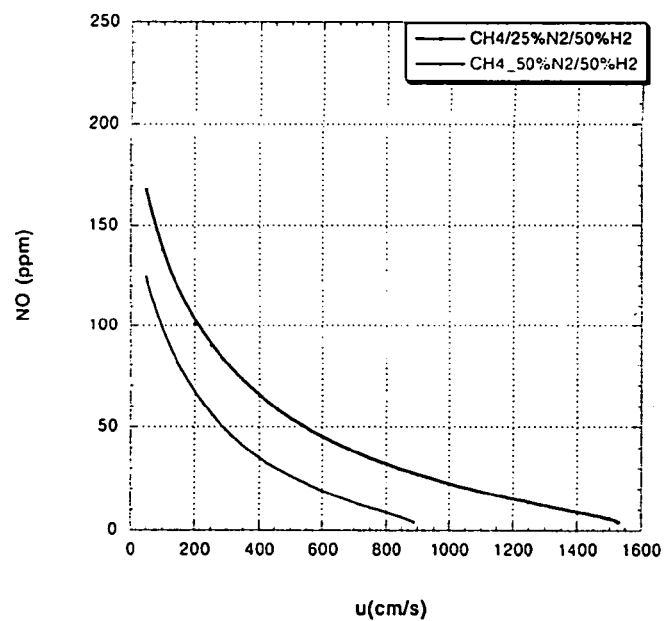

Shown in FIGS. 2b and 3b are the corresponding results for a fuel mixture of 50 vol % $CH_4$ and 50 vol % $H_2$. Again the behavior is similar, with a decrease in $T_{max}$ and NO with increasing inlet velocity. However, attention is drawn to the fact that the inlet velocity (and thus the strain rate) at which flame extinction occurs is significantly higher, approaching u=1600 cm/sec in the case with 25 vol % $N_2$ dilution. This is a direct result of the enhanced ability of the flame to withstand strain when hydrogen is added.

The results of all the cases studied are summarized in Table 1 below. Strain rates corresponding to the various inlet velocities are also included in the bottom row of the table. It can be seen that for all fuel mixtures ($CH_4/H_2$ ratios) studied, $N_2$ dilution up to 50 vol % is effective at reducing the NO levels to the low ppm levels. However, without $H_2$ addition the strain rates at which a stable flame can be maintained are limited to the lower range of values. With $H_2$ addition, stable flames can be achieved at significantly higher strain rates. The optimal combination of methane/hydrogen and diluent in the fuel mixture thus depends on the combustor operating conditions through the strain rates that are imposed by the flow conditions, or combustor throughput. Higher flow rates result in higher strain rates and might necessitate greater amounts of $H_2$ addition, while lower throughput might require less $H_2$ addition for a stable flame. Based on an economic analysis with regard to premixed flames for NO control, it is expected that $H_2$ additions comprising over 50% of the inlet gas volume would not be economically justified based simply on NO emission reduction. If $CO_2$ reduction resulting from $H_2$ addition were considered then a hydrogen concentration of about 72% would be preferred.

An additional consideration is the $H_2$ addition levels needed in a practical gas turbine combustor to maintain a stable flame (i.e. prevent extinction) with $N_2$ dilution. Velocity measurements made in a laboratory scale swirl burner consistent with a gas turbine type flow environment have shown strain rates based on the average velocity field on the order of 4,000 $sec^{-1}$. Highly-localized instantaneous strain rates of up to 20,000 $sec^{-1}$ were also measured in the same burner. Since the highly-localized instantaneous strain rates would most likely result in only local flame extinction while the overall flame remains stable, the best measure of strain rate would be based on the average velocity field. This value, 4,000 $sec^{-1}$ compares well with the value of 6,500 $sec^{-1}$ seen in Table 1 at which a stable flame can be maintained with a 50% mixture of $CH_4$ and $H_2$. Thus, $H_2$ addition levels up to 50% would be preferred for typical operating conditions, but situations in which higher levels could be utilized are also reasonable.

TABLE 1

Variation of NO emissions with fuel composition and diluent addition.

| Fuel Composition | | Diluent Volume Fraction | u = | u = | u = | u = |
|---|---|---|---|---|---|---|
| $CH_4$ | $H_2$ | ($N_2$) | 200 cm/s | 300 cm/s | 800 cm/s | 1500 cm/s |
| 1.0 | 0.0 | 0.0 | 60 ppm | Extinction | Extinction | Extinction |
| 1.0 | 0.0 | 0.25 | 40 ppm | " | " | " |
| 1.0 | 0.0 | 0.50 | 10 ppm | " | " | " |
| 0.8 | 0.2 | 0.0 | 120 ppm | 80 ppm | Extinction | Extinction |
| 0.8 | 0.2 | 0.25 | 80 ppm | 50 ppm | " | " |
| 0.8 | 0.2 | 0.50 | 40 ppm | 15 ppm | " | " |
| 0.5 | 0.5 | 0.0 | 140 ppm | 100 ppm | 70 ppm | 40 ppm |
| 0.5 | 0.5 | 0.25 | 100 ppm | 65 ppm | 30 ppm | 3 ppm |
| 0.5 | 0.5 | 0.50 | 67 ppm | 42 ppm | 8 ppm | Extinction |
| Strain Rate ($sec^{-1}$) | | | 1200 | 2200 | 4200 | 6500 |

Figure 4:
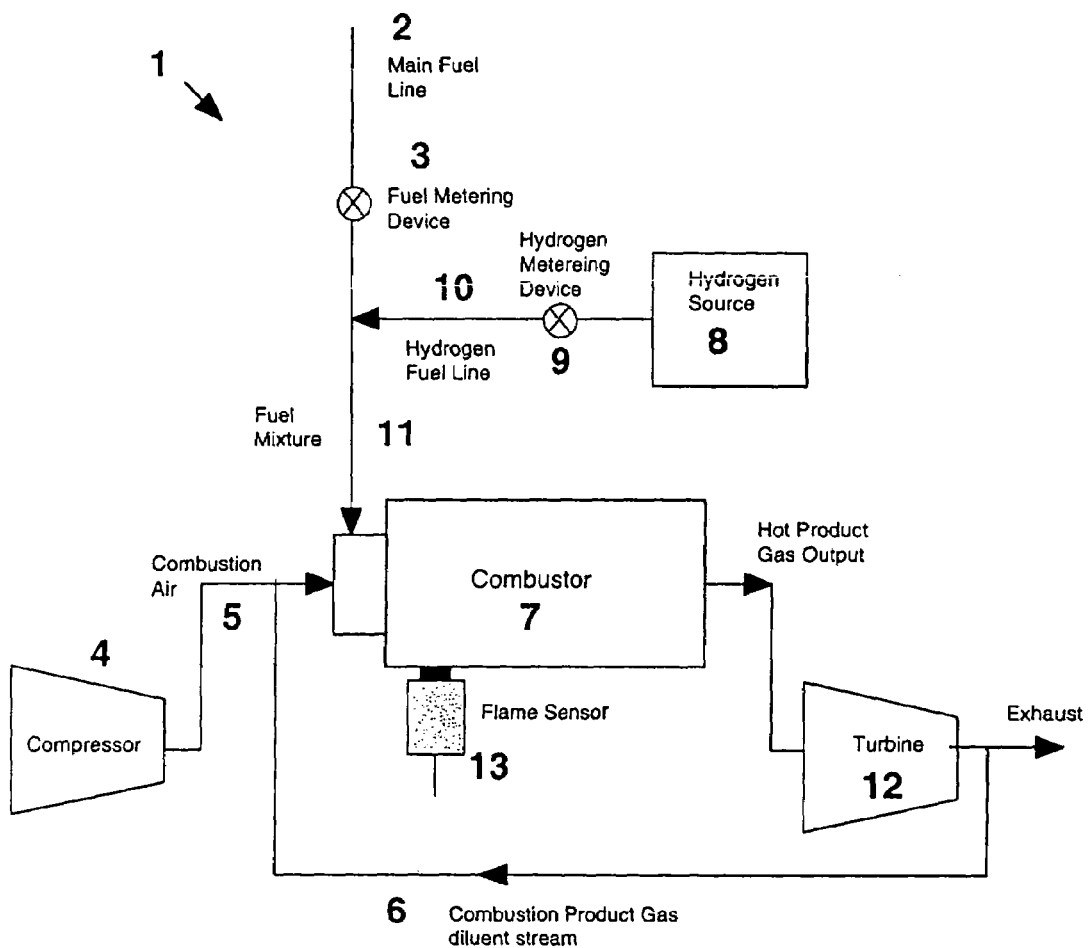
FIG. 4 illustrates one embodiment of the invention wherein combustion product gas is used as a diluent.

In one embodiment of the invention, illustrated in FIG. 4, hydrogen gas from a hydrogen gas source 8 is introduced into the fuel stream through main fuel line 2. Diluent gas is introduced into the combustion air line 5 and mixed with the combustion air prior to being introduced into the combustor. In this embodiment, the diluent gas is provided by recycling a portion of the cooled combustion product gas from the exhaust of turbine 12.

Figure 5:
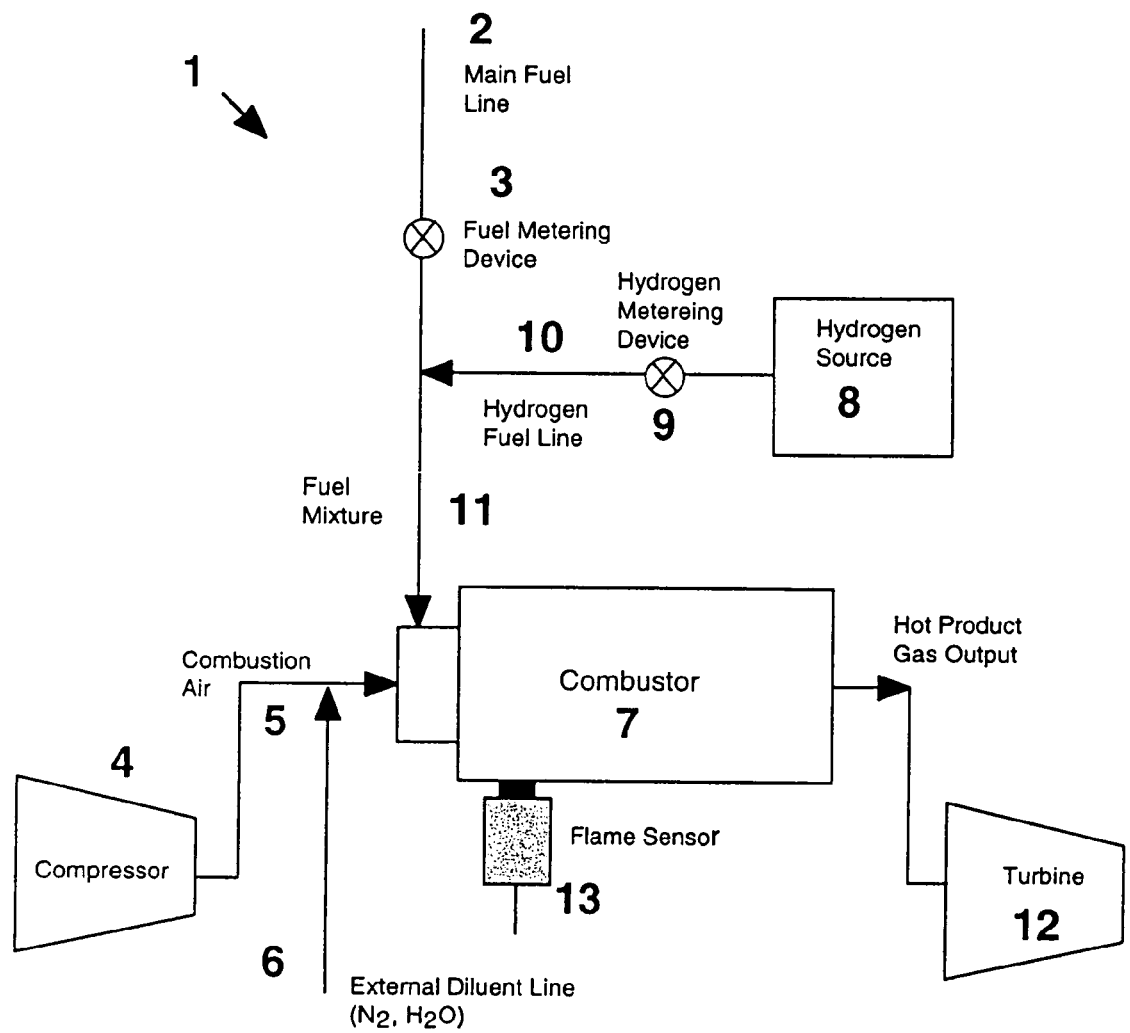
FIG. 5 illustrates an embodiment wherein external diluents are added.

In a second embodiment, illustrated in FIG. 5, the diluent gas ($N_2$ or $H_2O$) is provided by an external source and fed into the combustion air line. It should be noted, that while the diluent gas is shown as being fed to the combustor through the inlet air line, it could also be added to the fuel mixture via the fuel line.

We claim:

1. A method for active control of the NOx emission level of a combustor, comprising:
   providing an inlet fuel mixture to the combustor comprising
      a base fuel, wherein said base fuel comprises a hydrocarbon fuel including natural gas, methane, coal gas, biomass-derived fuel or other hydrocarbon fuel materials;
      a diluent gas, wherein the diluent gas includes nitrogen, water vapor, or a combustion product gas; and
      a gas to promote flame stability.

2. The method of claim 1, wherein diluent gas is provided by recycling a portion of a cooled combustion product gas.

3. The method of claim 1, wherein the diluent gas is present at a concentration equal to or less than about 50 vol %.

4. The method of claim 1, wherein the gas providing flame stability is hydrogen.

5. The method of claim 4, wherein the hydrogen is added to the inlet fuel mixture in an amount sufficient to substantially reduce or eliminate flame instabilities.

6. The method of claim 5, wherein the hydrogen is about 50 vol % of the inlet gas mixture.

7. A method for maintaining a stable flame in a combustor, wherein the flame strain rate is greater than about 1200 $sec^{-1}$, comprising the step of adding hydrogen to an inlet fuel mixture consisting essentially of a base fuel and a diluent gas.

8. The method of claim 7, wherein the hydrogen concentration is less than about 72 vol %.

* * * * *